United States Patent
Bish et al.

(10) Patent No.: US 10,885,054 B2
(45) Date of Patent: Jan. 5, 2021

(54) TRACKING METADATA CHANGES IN MULTIPLE DATA STORES AND GENERATING ALERTS FOR DETECTED DATA IMPACTS

(71) Applicant: MASTERCARD INTERNATIONAL INCORPORATED, Purchase, NY (US)

(72) Inventors: Samuel Gerald Bish, St. Louis, MO (US); David C. Youngberg, St. Charles, MO (US); Chrystal J. Sander, Ballwin, MO (US); Richard William Wallen, Kirkwood, MO (US); Katie Marie Reece, St. Charles, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 213 days.

(21) Appl. No.: 16/027,260

(22) Filed: Jul. 3, 2018

(65) Prior Publication Data
US 2020/0012740 A1    Jan. 9, 2020

(51) Int. Cl.
| | | |
|---|---|---|
| G06F 16/00 | (2019.01) | |
| G06F 16/25 | (2019.01) | |
| G06F 11/34 | (2006.01) | |
| G06F 16/907 | (2019.01) | |

(52) U.S. Cl.
CPC ........ *G06F 16/258* (2019.01); *G06F 11/3476* (2013.01); *G06F 16/907* (2019.01)

(58) Field of Classification Search
None
See application file for complete search history.

(56) References Cited

U.S. PATENT DOCUMENTS

| | | | | |
|---|---|---|---|---|
| 8,311,981 | B2 * | 11/2012 | Braginsky | H04L 67/42 707/618 |
| 8,615,534 | B2 * | 12/2013 | Cannon | G06F 16/119 707/825 |
| 9,058,335 | B2 * | 6/2015 | Pidduck | G06F 16/13 |
| 9,158,472 | B2 * | 10/2015 | Kesselman | G06F 3/067 |
| 9,400,828 | B2 * | 7/2016 | Kesselman | G06F 16/2291 |
| 9,875,305 | B2 * | 1/2018 | Pidduck | G06F 16/13 |
| 9,934,240 | B2 * | 4/2018 | Bradshaw | G06F 16/178 |
| 10,303,658 | B2 * | 5/2019 | Abbott | G06F 16/1824 |
| 2016/0306827 | A1 * | 10/2016 | Dos Santos | G06F 16/25 |

* cited by examiner

*Primary Examiner* — Debbie M Le

(57) ABSTRACT

The disclosure facilitates management of a plurality of related data stores by tracking metadata changes across the data stores, detecting the impact of the tracked metadata changes, and generating alerts based on the detected impact. Metadata change data from a plurality of data stores are received by a change impact engine and recorded to a centralized metadata change data structure. At least one change impact rule is applied to the recorded metadata change data and, upon detection of an impact based on the applied change impact rule, an alert based on the applied impact rule is generated. Consolidating the metadata change data from multiple data stores and detecting metadata changes that will significantly impact the operation of the associated system provide advance opportunities to manage and/or mitigate the impact of the metadata changes.

20 Claims, 5 Drawing Sheets

TRACKING METADATA CHANGES IN MULTIPLE DATA STORES AND GENERATING ALERTS FOR DETECTED DATA IMPACTS

BACKGROUND

Managing data storage is challenging in large, complex systems that include multiple distributed data stores. For instance, a system may store multiple types and/or sets of data across several data stores, and each data store may be configured on a different data platform. The types of data may be interrelated and/or duplicated on each platform, requiring coordination across the data stores. When each data store is maintained separately, ensuring effective maintenance of the distributed group of data stores may be complicated and error-prone. Coordinating the system of multiple data stores requires monitoring of changes, such as changes to dimensional data and/or other metadata changes, across all of the data stores. However, differences in configuration of each data store, based on differences in the associated data platforms or the like, may result in inconsistencies across the data stores. Additionally, changes to the multiple data stores may impact the operation of the system at large, but such impacts may not be accurately identified based on changes made on individual data stores.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for generating alerts based on detecting impact of metadata changes is described. The method comprises receiving, by a change impact engine, metadata change data from a plurality of data stores, the metadata change data associated with changes to metadata of the plurality of data stores. The received metadata change data is recorded to a centralized metadata change data structure, the centralized metadata change data structure stored by the change impact engine. At least one change impact rule is applied to the recorded metadata change data and, upon detection of an impact based on the applied at least one change impact rule, an alert based on the applied at least one change impact rule is generated.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 5, the systems are illustrated as schematic drawings. The drawings may not be to scale.

DETAILED DESCRIPTION

The systems and methods described herein are configured to facilitate management of a plurality of related data stores by tracking metadata changes across the data stores, detecting the impact of the tracked metadata changes, and generating alerts based on the detected impact. Metadata change data is received and recorded in a centralized data structure, change impact rules are applied to the metadata change data to detect impact to the operation of the system, and alerts are generated based on the detected impact. The disclosure enables the consolidation of metadata change data from a plurality of data stores and detection of impacts based on patterns of the consolidated metadata change data, providing an efficient way to monitor changes to the plurality of data stores and generate alerts to provide advance warning when issues based on the changes may potentially occur.

In some examples, applying change impact rules to the consolidated metadata change data from a set of data stores enables efficient analysis of the change data, such that the change impact rules need only be applied once, rather than at each data store. Additionally, change impact rules may be used that are based on metadata change patterns that are cross-data store and/or cross-platform, enabling detection of metadata change patterns or scenarios that would not be detectable at individual data stores.

The centralized metadata change data structure further provides redundant storage of the metadata change data and reduces a total amount of processing time required to apply change impact rules to the metadata change data from the plurality of data stores. The disclosure may provide improved user experience and user interaction efficiency, as well as increased access to business knowledge, enabling users of the described systems to configure, activate, and/or use the change impact engine as well as access consolidated metadata change data and generated alerts associated with all of the data stores from a centralized location and/or portal. The consolidation of the metadata change tracking described herein reduces the rate of errors stemming from metadata changes in data stores and increases users' efficiency in responding to detected impacts.

Figure 1:
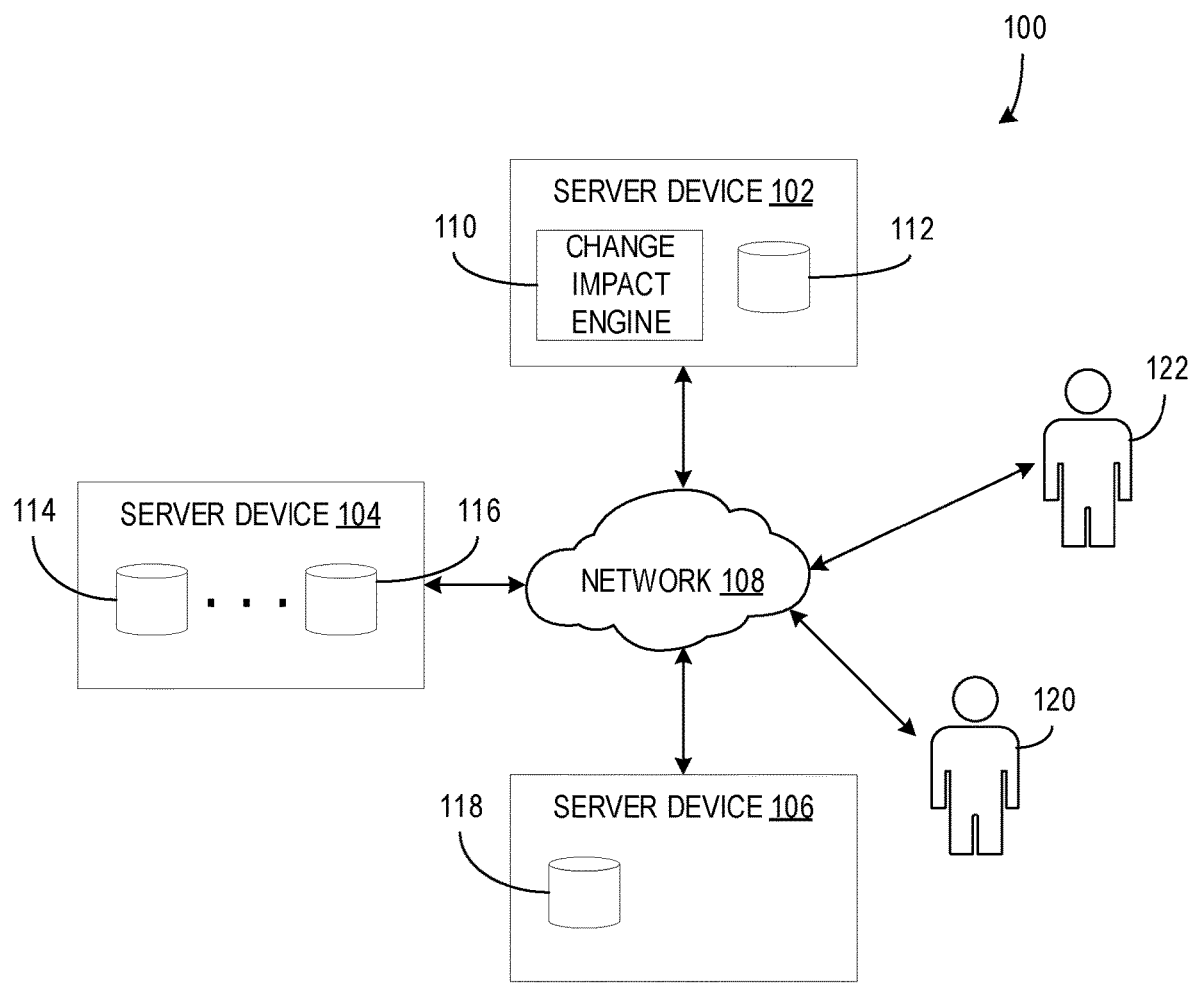
FIG. 1 is an exemplary block diagram illustrating a system configured for detecting the impact of metadata changes and generating associated alerts according to an embodiment.

FIG. 1 is an exemplary block diagram illustrating a system configured for detecting the impact of metadata changes and generating associated alerts according to an embodiment. The system 100 includes server devices 102, 104, and 106 connected by a network 108. The server devices 102, 104, and 106 are computing devices (e.g., servers, personal computers, laptops, etc.) configured to communicate over the network 108, which may be a wired network, wireless network, private intranet, public network such as the Internet, or a combination thereof. The server devices 102, 104, and 106 include processors, memory, interfaces, etc. as described below with respect to the computing apparatus of FIG. 5.

The server device 102 includes a change impact engine 110 and a metadata change data structure 112 that stores centralized, consolidated metadata change data associated with a plurality of data stores (e.g., data stores 114, 116, and 118 on server devices 104 and 106, etc.) throughout the system 100. The metadata change data structure 112 is centralized across the set of data stores and/or data platforms, such that it is configured to receive and store metadata change data from the entire set of data stores, including metadata change data from different data platform configurations. The change impact engine 110 comprises a software component, module, etc. of server device 102 that is configured to receive metadata change data from the data stores 114, 116, and 118 and analyze the received metadata change data to detect the impact of the associated metadata changes. Further, the change impact engine 110, and/or the associated service device 102, comprises a computer processor configured to execute computer-executable instructions for performing the operations described herein. The change impact engine 110 records the metadata change data in the consolidated metadata change data structure 112, enabling analysis of change data from all of the data stores 114, 116, and 118 at once. Further, the change impact engine 110 is configured to generate alerts based on detected impacts of the metadata changes. Generating the alerts may include causing notifications to be sent to responsible parties 120 and/or 122 (e.g., technicians, engineers, management teams, etc.) as described herein.

The data stores 114, 116, and 118 store data sets that are related but of different types or categories. For instance, data store 114 may store customer data while data store 116 stores product data and data store 118 further stores transaction data. Transactions in data store 118 may be linked to customers whose data is stored in data store 114 who have purchased products associated with data stored in data store 116. Data stores may also store data associated with banks, other client entities, bin ranges, account ranges, member data, currencies, currency codes, etc. The data stores 114, 116, and 118 may be based on the same or different data platforms (e.g., relational databases such as ORACLE databases or SQL databases, HADOOP platforms, etc.). A single server device may include one data store (e.g., server device 106 with data store 118, etc.) or multiple data stores (e.g., server device 104 with data stores 114 and 116, etc.). In some examples, one or more data stores may be included on the server device 102 with the change impact engine 110 as well. The consolidated metadata change data structure 112 is configured to store data from different data stores and/or different data platforms.

Data stores 114, 116, and 118 may include metadata change logs that include metadata change data associated with metadata changes that have occurred on the data stores. As metadata changes occur, metadata change data describing the changes may be recorded to the metadata change logs. For instance, a data store may include a defined number of columns that represent attributes of the data being stored and rows for each individual data item. If an additional column is added, a column is changed, or a column is removed, the metadata change is recorded in the metadata change log of the data store. An entry in the metadata change log may include, for instance, a date and/or time of the change, a data store identifier, a code identifying the type of change made (e.g., a code for adding a column, etc.), an identifier of the column or attribute to which the change was applied, etc. Other metadata changes may include changing a value set of an attribute (e.g., an attribute that categorizes a product as "large" or "small" may be changed to include a "medium" category, etc.), linking the data to another table or data store (e.g., a column including indices to other data stores and/or tables within data stores may be added, etc.), changing attribute values of rows in bulk (e.g., in a data store with rows identifying stores, all values in an owner identifier column indicating a first owner of the stores are changed to an owner identifier of a second owner when the stores of the first owner are acquired by the second owner, etc.), other dimensional data changes (e.g., changes that alter the organization of data in a data store rather than just changing data stored therein), etc.

Server devices 104 and 106 and/or data stores 114, 116, and 118 may provide subscription services to the respective metadata change logs. The change impact engine 110 may subscribe to the subscription services via an application program interface (API) or the like, such that updates to the metadata change logs are published or otherwise provided to the change impact engine 110. The metadata change data from the metadata change logs of the plurality of data stores 114, 116, and 118 may be cascaded, streamed, or otherwise sent to the change impact engine 110 based on defined periods of time (e.g., the metadata change data is sent once a day, etc.) and/or based on defined events (e.g., the unsent metadata change data in the metadata change log exceeds a defined capacity, such as 20, 50, or 100 metadata change records, etc.).

Alternatively, or additionally, the change impact engine 110 may request some or all of the metadata change data in the metadata change logs via an API provided by through the subscription services of the metadata change logs. In some examples, the change impact engine 110 requests metadata change data from the metadata change logs at regular intervals, such as once every 6 hours, 12 hours, 1 day, etc. Further, the change impact engine 110 may request metadata change data based on defined events and/or manual instructions from a user.

The responsible parties 120 and 122 are people or teams of people to whom notifications may be sent based on impacts detected by the change impact engine 110. For instance, responsible party 120 may be a technician or team of technicians responsible for maintaining the server device 106 and/or the data store 118. In an example, when the change impact engine 110 detects an impact that may be avoided and/or mitigated by the responsible party 120 taking action with respect to the server device 106 or the data store 118, a notification is sent to the responsible party 120. Alternatively, or additionally, the responsible party 122 may be a client-facing person or team and, when the change impact engine 110 detects an impact that may adversely affect a client with which the responsible party 122 is associated, the change impact engine 110 may cause a notification to be sent to the responsible party 122 to enable the responsible party 122 to mitigate the impact to the client.

Figure 2:
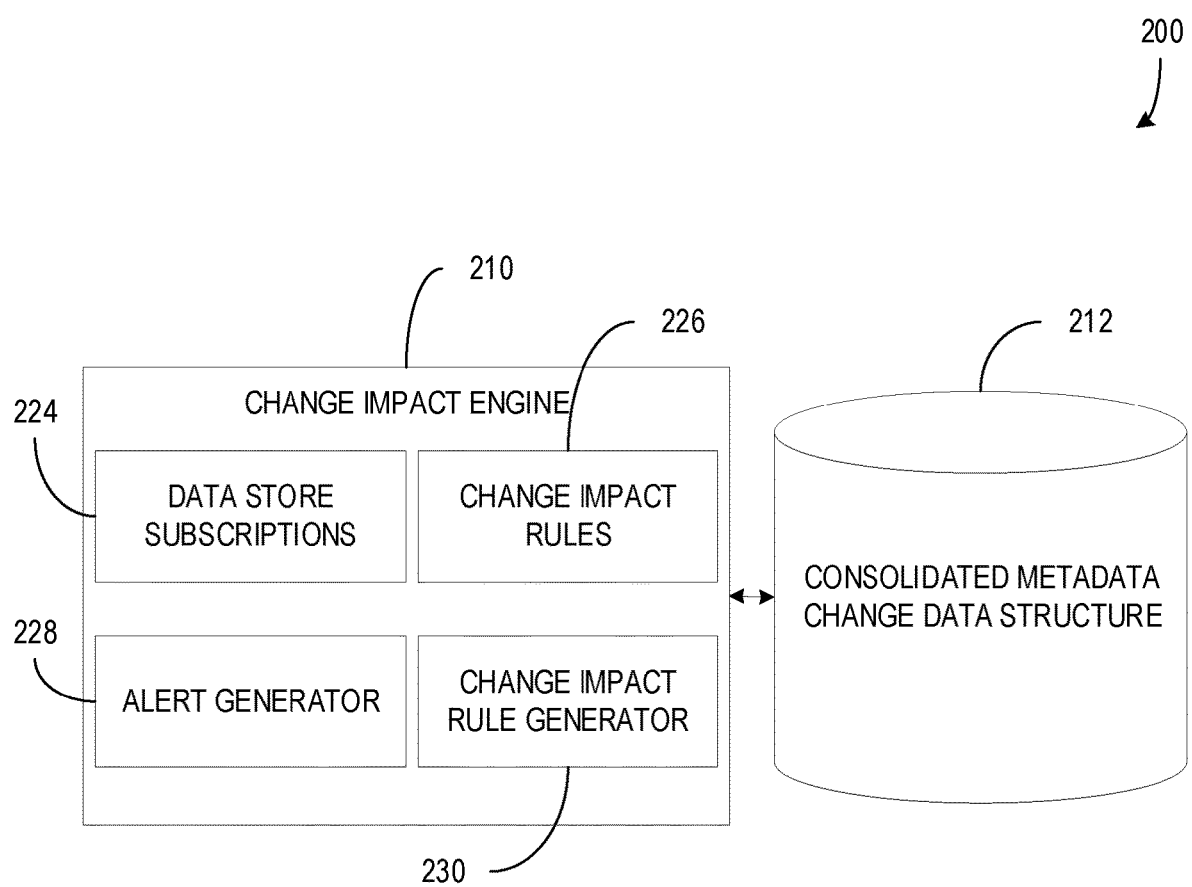
FIG. 2 is an exemplary block diagram illustrating a change impact engine and an associated consolidated metadata change data structure according to an embodiment.

FIG. 2 is an exemplary block diagram 200 illustrating a change impact engine 210 and an associated consolidated metadata change data structure 212 according to an embodiment. Change impact engine 210 includes data store subscriptions 224, change impact rules 226, an alert generator 228, and a change impact rule generator 230.

The data store subscriptions 224 include data identifying the data stores (e.g., data stores 114, 116, and 118, etc.) to which the change impact engine 210 is subscribed. For instance, the data store subscriptions 224 may include addresses or other identifiers of data stores, names of data stores, types or categories of data stored at the data stores, timing data indicating when metadata change data is requested and/or received from the data stores, and/or event data indicating events that cause metadata change data to be requested and/or received from the data stores. In some examples, the data store subscriptions 224 are included in the change impact engine 210 based on manual configuration by a user. Further, data store subscriptions 224 may also be edited or removed from the change impact engine 210 via manual configuration or the like. For instance, the change impact engine 210 may expose APIs that enable adding, editing, and removing of data store subscriptions, such that a user may register a new data store with the change impact engine 210, edit the identifying information of a data store or configuration details of the associated data store subscription 224, or remove an obsolete data store from the data store subscriptions 224.

The change impact rules 226 are applied to the metadata change data in the consolidated metadata change data structure 212 to detect potential impact of the metadata changes. Detected impacts may affect people, processes, and/or system elements that depend on or otherwise use the data stored in the data stores associated with the metadata change data. Change impact rules 226 are configured to compare portions of the metadata change data to defined metadata change patterns and, when the metadata change data is sufficiently similar to the defined metadata change patterns, the associated change impact rules 226 are triggered, causing alerts associated with the triggered change impact rules 226 to be generated.

In an example, a change impact rule 226 is triggered when a defined number of rows (e.g., 1000 rows, 5000 rows, 10,000 rows, etc.) in a data store is affected by a metadata change in the data store. For instance, when the metadata of a data store is changed by adding a new column to a data table that includes 10,000 rows, all the rows in the data table are affected, triggering a change impact rule 226 that detects changes to, for instance, greater than 1000 rows in the data table. Other examples of change impact rules 226 include rules that are triggered when changes affect more than a defined percentage of data in the data store, rules that are triggered when changes affect a critical portion of data in the data store, rules that are triggered when the more than a defined percentage of the data affected by the changes is data in a particular category, etc.

The change impact rules 226 may include rules that are configured to detect impacts of metadata changes based on metadata change data from multiple data stores. For instance, an exemplary change impact rule 226 may compare metadata change patterns to metadata change data from all three of the data stores 114, 116, and 118. Because the metadata change data from multiple data stores (and multiple data platforms thereon) is combined into the consolidated metadata change data structure 212, cross-data store and cross-platform metadata change patterns may be detected through application of change impact rules 226 as described herein. For instance, a data store associated with companies, configured for a first data platform type, may be separate from a data store associated with specific store locations, configured for a second data platform type. Metadata changes to the company data store may not generate metadata change data that is sufficient to detect a potential negative impact alone, but when combined with metadata change data from the store location data store, a complete impact of the changes can be detected using a change impact rule based on a cross-platform metadata change pattern.

Further, change impact rules 226 may be defined that detect a lack of expected metadata change data. In an example, when a metadata change occurs in one data store, there may be a related data store in which a related metadata change should occur based on defined metadata change patterns. A change impact rule 226 may be configured to detect if a change occurs in the first data store but not the second related data store and, in response to the metadata change discrepancy, generate an alert as described herein.

The impacts that may be detected by application of change impact rules 226 to the metadata change data in the consolidated metadata change data structure 212 include a variety of potential events and/or states that may be caused by the associated metadata changes. For instance, a significant change in the metadata of a data store associated with client-specific data may affect reports that are generated for that client from the data in the data store. While the effect to the reports may not be negative, an alert associated with the metadata change may enable a client-facing user or team to prepare for the change and/or warn the client of the changes prior to the reports being sent to the client. In other examples, detected impacts may be more negative in nature. For instance, a detected impact may include a detected error in the metadata changes. In some cases, a change to a particular element of the metadata of a data store may be in error, such that, if the error goes undetected, it may cause the data stored in the data store to be inaccurate. Further, metadata changes may occur in an incomplete fashion, such that changes do not occur in all of the appropriate locations in a data store or across multiple data stores. Detection of metadata change errors such as these enables the appropriate parties (e.g., technicians, engineers, etc.) to correct the errors, revert the changes, or complete the changes as necessary.

The alert generator 228 is a software component of the change impact engine 210 that generates alerts in response to triggered change impact rules 226. Generated alerts may include alerts that are logged within the change impact engine 210 or associated data storage as well as alerts that are sent to responsible parties (e.g., responsible parties 120, 122, etc.) in the form of notifications. The alert generator 228 may include different types of alerts (e.g., error alerts, client-facing change alerts, inconsistent change alerts, etc.), responsible party identity information (e.g., names, email addresses, and/or phone numbers of responsible parties for aspects of data stores, etc.), recommended actions to be taken, etc.

In some examples, the alert generator 228 includes relationships between change impact rules 226 and specific alerts or types of alerts that are generated based on the triggering of the change impact rules 226. The alert generator 228 identifies one or more alerts to generate by mapping a triggered change impact rule 226 to the types of alerts to which the triggered change impact rule 226 is related. For instance, a defined change impact rule 226 that detects metadata change error impacts in a product-based data store may cause a notification to be sent to a team of technicians that are responsible for maintaining the product-based data store based on a relationship defined in the alert generator 228. Further, when a change impact rule 226 detects a specific error in the data store, the notification may include a recommended course of action that the technician team can take based a relationship between the change impact rule 226 and the recommended course of action as defined in the alert generator 228.

Alert notification may include the automated sending of email, voice mail, short message service (SMS) messages or the like. Further, a notification may be provided by an interface (e.g., a graphical user interface (GUI) on a screen, etc.) to a user of a computing device associated with a data store or the change impact engine 210. An alert generated by the alert generator 228 may cause multiple notifications to be sent to multiple identified responsible parties via any of the methods identified herein or the like.

The change impact engine 210 further includes a change impact rule generator 230 for creation of change impact rules 226. In some examples, the change impact engine 210 receives feedback from a user regarding metadata change data. The user feedback identifies a portion of metadata change data as a metadata change pattern and defines an impact that may be detected based on the identified pattern. The feedback may further include responsible party information, alert type data, and/or recommended course of action data for use by the alert generator 228. The change impact rule generator 230 may provide the user with an interface through which the user provides the feedback. Once the feedback is complete, the change impact rule generator 230 generates a change impact rule 226 based on the identified metadata change pattern and associates the provided alert relationship information with the generated change impact rule 226 in the alert generator 228.

Alternatively, or additionally, the user may identify a type of impact that occurred, a timeframe in which the impact occurred, and the affected data stores as feedback to the change impact rule generator 230. The change impact rule generator 230 may take a metadata change data snapshot of the metadata change data from the affected data stores during the identified timeframe. The change impact rule generator 230 may then identify a metadata change pattern in the metadata change data snapshot and generate a change impact rule 226 from the identified metadata change pattern. The provided type of impact may be used by the change impact rule generator 230 to configure the alert generator 228 to generate an alert associated with the type of impact when the newly generated change impact rule is triggered in the future.

In some cases, change impact rules 226 may result in false positive alert generation or failure to generate alerts when necessary. The change impact rule generator 230 enables a user to edit existing change impact rules 226 to adjust thresholds and/or other aspects of the change impact rules 226 to improve future accuracy.

Figure 3:
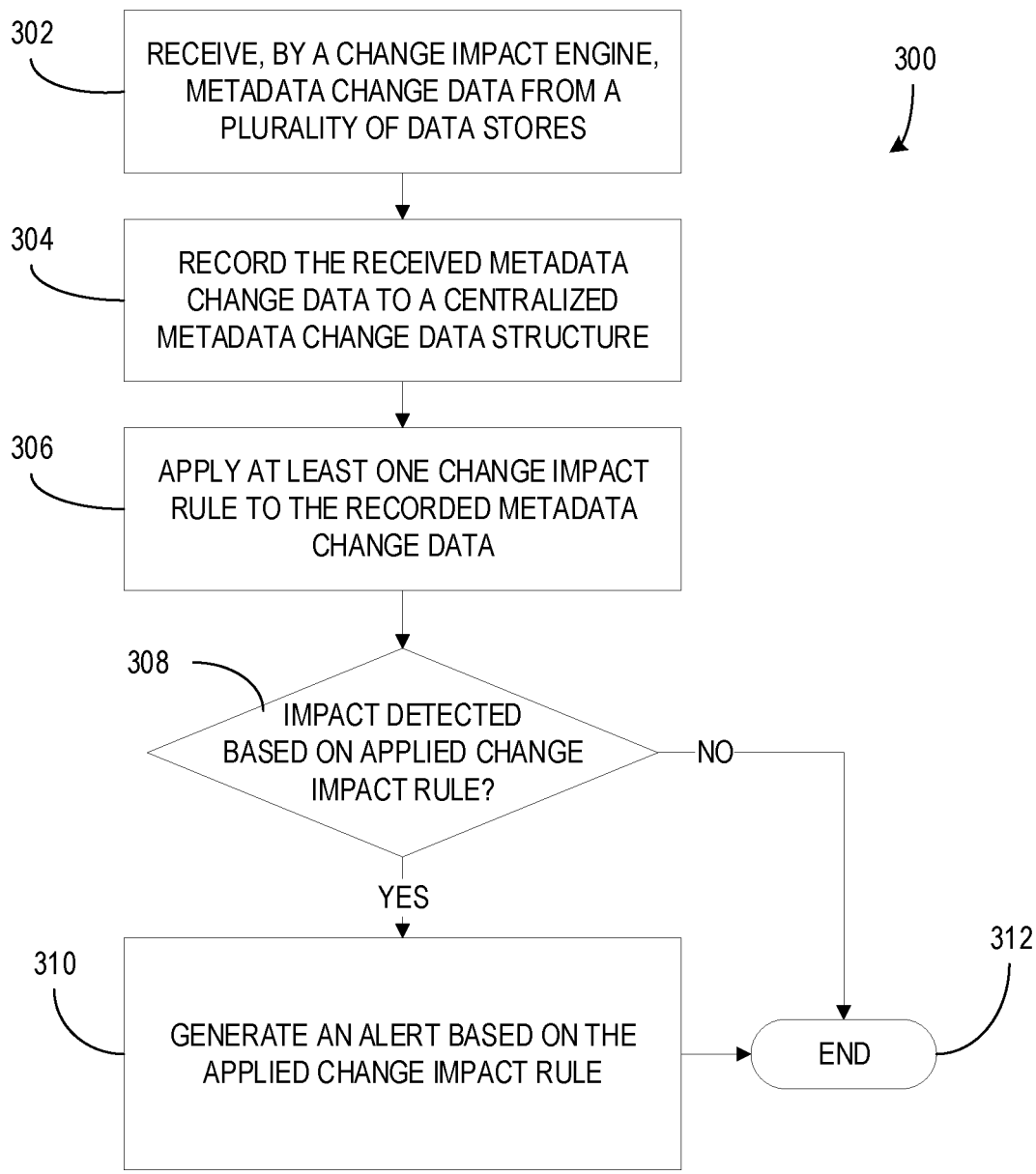
FIG. 3 is an exemplary flow chart illustrating detecting impact of metadata changes and generating associated alerts according to an embodiment.

FIG. 3 is an exemplary flow chart 300 illustrating detecting impact of metadata changes and generating associated alerts according to an embodiment. At 302, a change impact engine receives metadata change data from a plurality of data stores. The received metadata change data may be received from one or multiple data stores of the plurality of data stores and may be in a variety of formats based on the data platforms with which the multiple data stores are configured. As described above, the metadata change data identifies the data store from which it is received, the time and date of the associated metadata changes, the type of metadata changes made, and/or other details associated with the metadata changes.

At 304, the received metadata change data is recorded to a centralized metadata change data structure. In some examples, the received metadata change data may be translated, parsed, or otherwise transformed into a data format that is compatible to the centralized, consolidated metadata change data structure. The received metadata change data may be in different data formats based on the data platform and/or other configuration details of the data store from which the metadata change data are received. Recorded metadata change data on the centralized metadata change data structure may be arranged according any appropriate data organization or database structure known in the art.

At 306, at least one change impact rule is applied to the recorded metadata change data. One or multiple change impact rules may be applied to some or all of the metadata change data. In some examples, change impact rules may be applied to only metadata change data that has been received since rules were previously applied. However, in alternative examples, the change impact rules may be applied to the current metadata change data in combination with a portion of the past metadata change data that has previously been recorded in the centralized metadata change data structure.

Applying change impact rules to the metadata change data may include comparing metadata change patterns associated with the change impact rules with the metadata change data and detecting an impact of the associated metadata changes when the metadata change data matches the metadata change patterns within a defined accuracy threshold. For instance, if a change impact rule is associated with a metadata change pattern that includes metadata changes that affect greater than or equal to 1000 rows of a data store with a defined accuracy threshold of 1% and the recorded metadata change data indicates changes that affect 992 rows of the data store, an impact is detected due to the metadata change data matching the metadata change pattern within the 1% accuracy threshold. In another example, a change impact rule is associated with a metadata change pattern that includes 100 data points for comparison to the metadata change data, wherein each data point is a specific metadata change, and a 5% accuracy threshold. Metadata change data that matches 95-100 of the data points of the metadata change pattern causes impact detection based on the metadata change data.

If, at 308, an impact is detected based on the at least one change impact rule, an alert is generated based on the applied at least one change impact rule at 310. Generated alerts may be logged and/or distributed as described herein. Alternatively, if an impact is not detected at 308, the process ends at 312.

Figure 4:
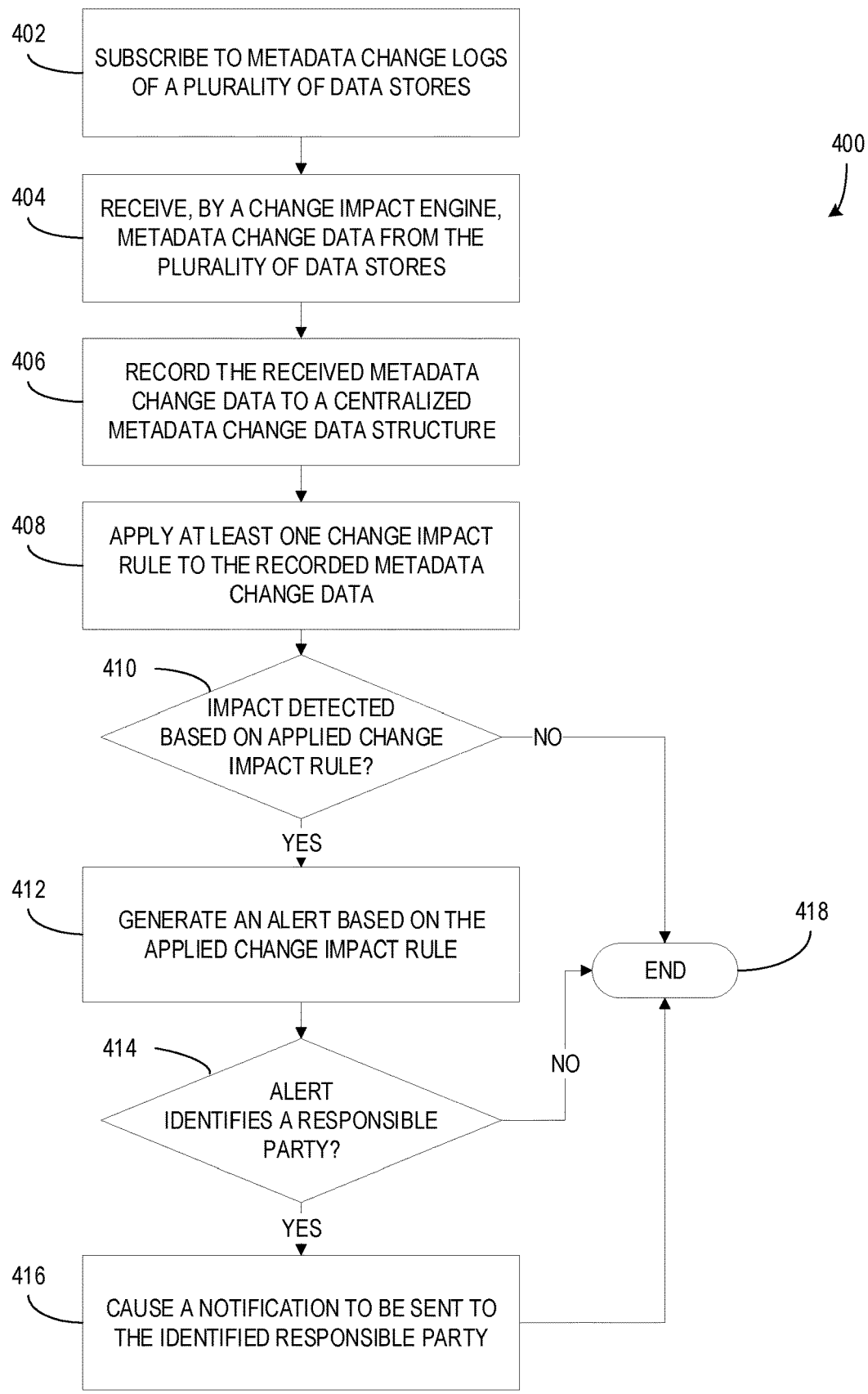
FIG. 4 is an exemplary flow chart illustrating detecting impact of metadata changes and generating associated alerts as in FIG. 3, including subscribing to metadata change logs and notifying responsible parties based on generated alerts according to an embodiment.

FIG. 4 is an exemplary flow chart 400 illustrating detecting impact of metadata changes and generating associated alerts as in FIG. 3, including subscribing to metadata change logs and notifying responsible parties based on generated alerts according to an embodiment. At 402, a change impact engine subscribes to metadata change logs of a plurality of data stores. Subscribing to metadata change logs of the data stores may be based on instructions provided by users of a computing device associated with the change impact engine, based on configuration of the change impact engine or based on configuration of associated data stores. The subscriptions may be enabled through APIs provided by the data stores and/or the change impact engine. The data stores may further be configured to maintain the metadata change logs automatically as metadata changes are made.

From 404 to 412, the metadata change data is received and stored, at least one change impact rule is applied thereto, and an alert may be generated in a substantially identical process as described above with respect to FIG. 3. The generated alert may include data associated with the detected impact and/or the associated change impact rule. For instance, the generated alert may include a type of impact, a severity or degree of impact, data sources affected by the impact, a date and time of the impact, and/or a party or parties responsible for managing, mitigating, or otherwise handling the impact. At 414, if the generated alert identifies a responsible party, a notification is caused to be sent to the identified responsible party at 416. Notifications sent to responsible parties may be sent via electronic mail, instant message, SMS message, voice mail, or the like. Further, sent notifications may include recommended courses of action and/or otherwise be configured according to the exemplary description provided above.

After the notification is caused to be sent, or if the alert does not identify a responsible party, the process ends at 418.

Additional Example Scenarios

Aspects of the disclosure enable various additional scenarios, such as next described.

In an example, a change impact engine receives metadata change data from a plurality of data stores. The metadata change data indicates metadata changes that affect more than 10% of data associated with Merchant A across two of the plurality of data stores. The change impact engine applies a rule that is triggered when 10% or greater of data associated with Merchant A is affected by a metadata change. When the change impact rule is triggered, an impact to Merchant A is detected and an associated alert is generated. The generated alert includes a notification that is sent to a client-facing team that manages Merchant A's account. Additionally, a notification may be sent to an engineer or technician that is responsible for one or both of the data stores from which the metadata change data was received.

In a further example, the metadata change data indicates metadata changes such that the 10% of the data affected is associated with Merchant A, 10% of the data affected is associated with Merchant B, and 10% of the data affected is associated with Merchant C. A change impact rule is applied that is triggered whenever 10% or more of the total data affected is associated with a particular merchant. As a result of the change impact rule being triggered, an alert is generated that includes sending notification to responsible parties associated with each of Merchant A, Merchant B, and Merchant C.

In another example, a change impact engine receives metadata change data indicating that a new column has been added to the data table of a data store. The addition of a column potentially affects all the rows of the data table, so a change impact rule that detects changes that affect a substantial percentage of data in the data table is triggered. An alert is generated that includes sending a notification to a technician or team that is responsible for the data store in which the change was made. If the change was intended, the technician or team may confirm that it was intended. If the change was not intended, the technician or team may correct the change. Further, the alert may include notifications that are sent to other teams that are responsible for related data stores to inform them that the data of the newly added column is available for use from the data table of the first data store.

In another example, a change impact engine receives metadata change data indicating that the ownership of 150 stores has changed from a first company to a second company. The metadata change data includes data from a store-specific data store as well as a company-specific data store. Change impact rules are applied that detect the significant impact of the change to both companies and the associated stores. The generated alert includes notifications to responsible parties for managing the associated company accounts. Further, notifications may be sent to technicians responsible for the store-specific data store and/or responsible parties associated with each of the stores with changed ownership.

In another example, a change impact engine receives metadata change data indicating metadata changes to three data stores that match a metadata change pattern defined in a change impact rule. However, the metadata change pattern includes metadata changes to a fourth data store, which are not reflected in the received metadata change data. The lack of expected metadata change data from the fourth data store triggers the change impact rule, causing an alert to be generated that notifies responsible parties of all four data stores, such that the responsible parties may either complete the changes to the fourth data store if the change was intended, revert the changes to the data stores if the change was unintended, or otherwise mitigate the detected impact to the data stores.

Exemplary Operating Environment

Figure 5:
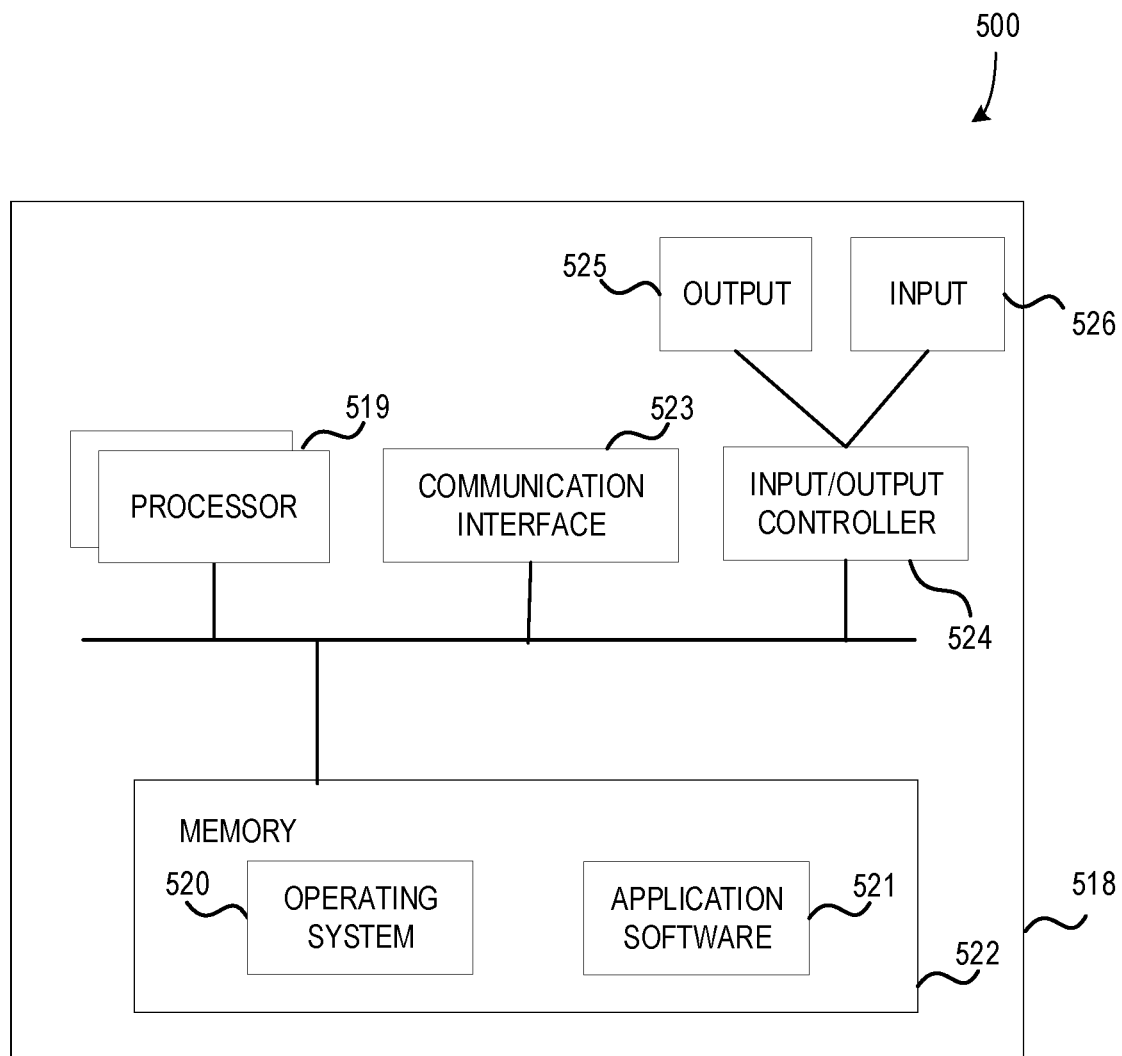
FIG. 5 illustrates a computing apparatus according to an embodiment as a functional block diagram.

The present disclosure is operable with a computing apparatus according to an embodiment as a functional block diagram 500 in FIG. 5. In an embodiment, components of a computing apparatus 518 may be implemented as a part of an electronic device according to one or more embodiments described in this specification. The computing apparatus 518 comprises one or more processors 519 which may be microprocessors, controllers or any other suitable type of processors for processing computer executable instructions to control the operation of the electronic device. Platform software comprising an operating system 520 or any other suitable platform software may be provided on the apparatus 518 to enable application software 521 to be executed on the device. According to an embodiment, tracking metadata changes across multiple data stores and/or data platforms and generating alerts based on detected data impacts of the tracked metadata changes as described herein may be accomplished by software.

Computer executable instructions may be provided using any computer-readable media that are accessible by the computing apparatus 518. Computer-readable media may include, for example, computer storage media such as a memory 522 and communications media. Computer storage media, such as a memory 522, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 522) is shown within the computing apparatus 518, it will be appreciated by a person skilled in the art, that the storage may be distributed or located remotely and accessed via a network or other communication link (e.g. using a communication interface 523).

The computing apparatus 518 may comprise an input/output controller 524 configured to output information to one or more output devices 525, for example a display or a speaker, which may be separate from or integral to the electronic device. The input/output controller 524 may also be configured to receive and process an input from one or more input devices 526, for example, a keyboard, a microphone or a touchpad. In one embodiment, the output device 525 may also act as the input device. An example of such a device may be a touch sensitive display. The input/output controller 524 may also output data to devices other than the output device, e.g. a locally connected printing device. In some embodiments, a user may provide input to the input device(s) 526 and/or receive output from the output device(s) 525.

The functionality described herein can be performed, at least in part, by one or more hardware logic components. According to an embodiment, the computing apparatus 518 is configured by the program code when executed by the processor 519 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

Alternatively, or in addition to the other examples described herein, examples include any combination of the following:

A system for generating alerts based on detecting impact of metadata changes, the system comprising:

at least one processor;

at least one memory comprising computer program code, the at least one memory and computer program code configured to, with the at least one processor, cause the at least one processor to:

receive, by a change impact engine, metadata change data from a plurality of data stores, the metadata change data associated with changes to metadata of the plurality of data stores;

record the received metadata change data to a centralized metadata change data structure, the centralized data structure being stored by the change impact engine;

apply at least one change impact rule to the recorded metadata change data; and upon detection of an impact based on the applied at least one change impact rule, generate an alert based on the applied at least one change impact rule.

The system described above, wherein the plurality of data stores store data based on a plurality of data platforms.

The system described above, wherein the metadata change data includes metadata change data formatted based on the plurality of data platforms and the centralized metadata change data structure is configured to store the metadata change data formatted based on the plurality of data platforms.

The system described above, wherein applying the at least one change impact rule to the recorded metadata change data includes:

comparing a metadata change pattern of the at least one change impact rule to metadata change data from a first data store of the plurality of data stores and metadata change data from a second data store of the plurality of data stores; and detecting an impact based on the applied at least one change impact rule when the metadata change data from the first data store and metadata change data from the second data store match the metadata change pattern within a defined accuracy threshold.

The system described above, the at least one memory and computer program code configured to, with the at least one processor, further cause the at least one processor to subscribe, by the change impact engine, to metadata change logging services of the plurality of data stores;

wherein receiving metadata change data from the plurality of data stores includes receiving metadata change data from the plurality of data stores based on the metadata change logging services to which the change impact engine is subscribed.

The system described above, wherein metadata change data is received from the plurality of data stores periodically based on defined time periods associated with the plurality of data stores.

A computerized method for generating alerts based on detecting impact of metadata changes, the method comprising:

receiving, by a change impact engine, metadata change data from a plurality of data stores, the metadata change data associated with changes to metadata of the plurality of data stores;

recording the received metadata change data to a centralized metadata change data structure, the centralized data structure being stored by the change impact engine;

applying at least one change impact rule to the recorded metadata change data; and upon detection of an impact based on the applied at least one change impact rule, generating an alert based on the applied at least one change impact rule.

The computerized method described above, wherein the plurality of data stores store data based on a plurality of data platforms.

The computerized method described above, wherein the metadata change data includes metadata change data formatted based on the plurality of data platforms and the centralized metadata change data structure is configured to store the formatted metadata change data.

The computerized method described above, wherein applying the at least one change impact rule to the recorded metadata change data includes:

comparing a metadata change pattern associated with the at least one change impact rule to metadata change data from a first data store of the plurality of data stores and metadata change data from a second data store of the plurality of data stores; and detecting an impact based on the applied at least one change impact rule when the metadata change data from the first data store and metadata change data from the second data store match the metadata change pattern within a defined accuracy threshold.

The computerized method described above further comprising subscribing, by the change impact engine, to metadata change logging services of the plurality of data stores;

wherein receiving metadata change data from the plurality of data stores includes receiving metadata change data from the plurality of data stores based on the metadata change logging services to which the change impact engine is subscribed.

The computerized method described above, wherein metadata change data is received from the plurality of data stores periodically based on defined time periods associated with the plurality of data stores.

The computerized method described above, further comprising sending a notification associated with the generated alert to a responsible party based on the applied at least one change impact rule.

The computerized method described above, wherein the at least one change impact rule is defined based on past metadata change patterns, the past metadata change patterns indicating metadata changes that caused impacts.

The computerized method described above, further comprising receiving, by the change impact engine, feedback identifying metadata change data in the centralized metadata change data structure that is associated with an impact; and generating, based on the received feedback, a new change impact rule derived from the identified metadata change data.

One or more computer storage media having computer-executable instructions for generating alerts based on detecting impact of metadata changes that, upon execution by a processor, cause the processor to at least:

receive, by a change impact engine, metadata change data from a plurality of data stores, the metadata change data associated with changes to metadata of the plurality of data stores;

record the received metadata change data to a centralized metadata change data structure, the centralized data structure being stored by the change impact engine;

apply at least one change impact rule to the recorded metadata change data; and upon detection of an impact based on the applied at least one change impact rule, generate an alert based on the applied at least one change impact rule.

The one or more computer storage media described above, wherein the plurality of data stores store data based on a plurality of data platforms.

The one or more computer storage media described above, wherein the metadata change data includes metadata change data formatted based on the plurality of data platforms and the centralized metadata change data structure is configured to store the formatted metadata change data.

The one or more computer storage media described above, wherein applying the at least one change impact rule to the recorded metadata change data includes:

comparing a metadata change pattern associated with the at least one change impact rule to metadata change data from a first data store of the plurality of data stores and metadata change data from a second data store of the plurality of data stores; and detecting an impact based on the applied at least one change impact rule when the metadata change data from the first data store and metadata change data from the second data store match the metadata change pattern within a defined accuracy threshold.

The one or more computer storage media described above, the computer-executable instructions, upon execution by a processor, further cause the processor to at least subscribe, by the change impact engine, to metadata change logging services of the plurality of data stores;

wherein receiving metadata change data from the plurality of data stores includes receiving metadata change data from the plurality of data stores based on the metadata change logging services to which the change impact engine is subscribed.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for tracking metadata changes across multiple data stores and/or data platforms and generating alerts based on detected data impacts of the tracked metadata changes. The illustrated one or more processors 519 together with the computer program code stored in memory 522 constitute exemplary processing means for applying change impact rules to consolidated metadata change data from multiple data stores and generating alerts based on the applied change impact rules.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for generating alerts based on detecting impact of metadata changes, the system comprising:
   at least one processor;
   at least one memory comprising computer program code, the at least one memory and computer program code configured to, with the at least one processor, cause the at least one processor to:
   receive, by a change impact engine, metadata change data from a plurality of data stores, the metadata change data associated with changes to metadata of the plurality of data stores;
   record the received metadata change data to a centralized metadata change data structure, the centralized data structure being stored by the change impact engine;
   apply at least one change impact rule based on at least one metadata change pattern to the recorded metadata change data, the at least one change impact rule enabling detection of metadata change patterns associated with changes to the metadata of the plurality of data stores, the at least one metadata change pattern comprising at least one cross-platform metadata change pattern; and
   upon detection of an impact of the changes to the metadata across the plurality of data stores based on the applied at least one change impact rule, generate an alert based on the applied at least one change impact rule.

2. The system of claim 1, wherein the plurality of data stores store data based on a plurality of data platforms, wherein the at least one change impact rule further comprises at least one of a cross-platform metadata change pattern used to detect the impact of the changes to the metadata across the plurality of data stores and the plurality of data platforms.

3. The system of claim 2, wherein the metadata change data includes metadata change data formatted based on the plurality of data platforms and the centralized metadata change data structure is configured to store the metadata change data formatted based on the plurality of data platforms.

4. The system of claim 1, wherein applying the at least one change impact rule to the recorded metadata change data includes:
   comparing a metadata change pattern of the at least one change impact rule to metadata change data from a first data store of the plurality of data stores and metadata change data from a second data store of the plurality of data stores; and
   detecting an impact based on the applied at least one change impact rule when the metadata change data from the first data store and metadata change data from the second data store match the metadata change pattern within a defined accuracy threshold.

5. The system of claim 1, the at least one memory and computer program code configured to, with the at least one processor, further cause the at least one processor to subscribe, by the change impact engine, to metadata change logging services of the plurality of data stores;
   wherein receiving metadata change data from the plurality of data stores includes receiving metadata change data from the plurality of data stores based on the metadata change logging services to which the change impact engine is subscribed.

6. The system of claim 1, the at least one memory and computer program code configured to, with the at least one processor, further cause the at least one processor to take a metadata change snapshot of the metadata change data; identify a metadata change pattern in the metadata change data snapshot and generate a change impact rule from the identified metadata change pattern.

7. A computerized method for generating alerts based on detecting impact of metadata changes, the method comprising:
   receiving, by a change impact engine, metadata change data from a plurality of data stores, the metadata change data associated with changes to metadata of the plurality of data stores;
   recording the received metadata change data to a centralized metadata change data structure, the centralized data structure being stored by the change impact engine;
   applying at least one change impact rule based on at least one metadata change pattern to the recorded metadata change data, the at least one change impact rule enabling detection of metadata change patterns associated with changes to the metadata of the plurality of data stores, the at least one metadata change pattern comprising at least one cross-platform metadata change pattern; and upon detection of an impact of the changes to the metadata across the plurality of data stores based on the applied at least one change impact rule, generating an alert based on the applied at least one change impact rule.

8. The computerized method of claim 7, wherein the plurality of data stores store data based on a plurality of data platforms, wherein the at least one change impact rule further comprises at least one of a cross-platform metadata change pattern used to detect the impact of the changes to the metadata across the plurality of data stores and the plurality of data platforms.

9. The computerized method of claim 8, wherein the metadata change data includes metadata change data formatted based on the plurality of data platforms and the centralized metadata change data structure is configured to store the formatted metadata change data.

10. The computerized method of claim 7, wherein applying the at least one change impact rule to the recorded metadata change data includes:

comparing a metadata change pattern associated with the at least one change impact rule to metadata change data from a first data store of the plurality of data stores and metadata change data from a second data store of the plurality of data stores; and detecting an impact based on the applied at least one change impact rule when the metadata change data from the first data store and metadata change data from the second data store match the metadata change pattern within a defined accuracy threshold.

11. The computerized method of claim 7 further comprising subscribing, by the change impact engine, to metadata change logging services of the plurality of data stores;

wherein receiving metadata change data from the plurality of data stores includes receiving metadata change data from the plurality of data stores based on the metadata change logging services to which the change impact engine is subscribed.

12. The computerized method of claim 7, wherein metadata change data is received from the plurality of data stores periodically based on defined time periods associated with the plurality of data stores.

13. The computerized method of claim 7, further comprising sending a notification associated with the generated alert to a responsible party based on the applied at least one change impact rule.

14. The computerized method of claim 7, wherein the at least one change impact rule is defined based on past metadata change patterns, the past metadata change patterns indicating metadata changes that caused impacts.

15. The computerized method of claim 14, further comprising receiving, by the change impact engine, feedback identifying metadata change data in the centralized metadata change data structure that is associated with an impact; and generating, based on the received feedback, a new change impact rule derived from the identified metadata change data.

16. One or more computer storage media having computer-executable instructions for generating alerts based on detecting impact of metadata changes that, upon execution by a processor, cause the processor to at least:

receive, by a change impact engine, metadata change data from a plurality of data stores, the metadata change data associated with changes to metadata of the plurality of data stores;

record the received metadata change data to a centralized metadata change data structure, the centralized data structure being stored by the change impact engine;

apply at least one change impact rule based on at least one metadata change pattern to the recorded metadata change data, the at least one change impact rule enabling detection of metadata change patterns associated with changes to the metadata of the plurality of data stores, the at least one metadata change pattern comprising at least one cross-platform metadata change pattern; and upon detection of an impact of the changes to the metadata across the plurality of data stores based on the applied at least one change impact rule, generate an alert based on the applied at least one change impact rule.

17. The one or more computer storage media of claim 16, wherein the plurality of data stores store data based on a plurality of data platforms, wherein the at least one change impact rule further comprises at least one of a cross-platform metadata change pattern used to detect the impact of the changes to the metadata across the plurality of data stores and the plurality of data platforms.

18. The one or more computer storage media of claim 17, wherein the metadata change data includes metadata change data formatted based on the plurality of data platforms and the centralized metadata change data structure is configured to store the formatted metadata change data.

19. The one or more computer storage media of claim 16, wherein applying the at least one change impact rule to the recorded metadata change data includes:

comparing a metadata change pattern associated with the at least one change impact rule to metadata change data from a first data store of the plurality of data stores and metadata change data from a second data store of the plurality of data stores; and detecting an impact based on the applied at least one change impact rule when the metadata change data from the first data store and metadata change data from the second data store match the metadata change pattern within a defined accuracy threshold.

20. The one or more computer storage media of claim 16, the computer-executable instructions, upon execution by a processor, further cause the processor to at least subscribe, by the change impact engine, to metadata change logging services of the plurality of data stores;

wherein receiving metadata change data from the plurality of data stores includes receiving metadata change data from the plurality of data stores based on the metadata change logging services to which the change impact engine is subscribed.

* * * * *